Jan. 16, 1951     H. SWANSON     2,538,600
FARM UTILITY BOAT
Filed Sept. 15, 1947
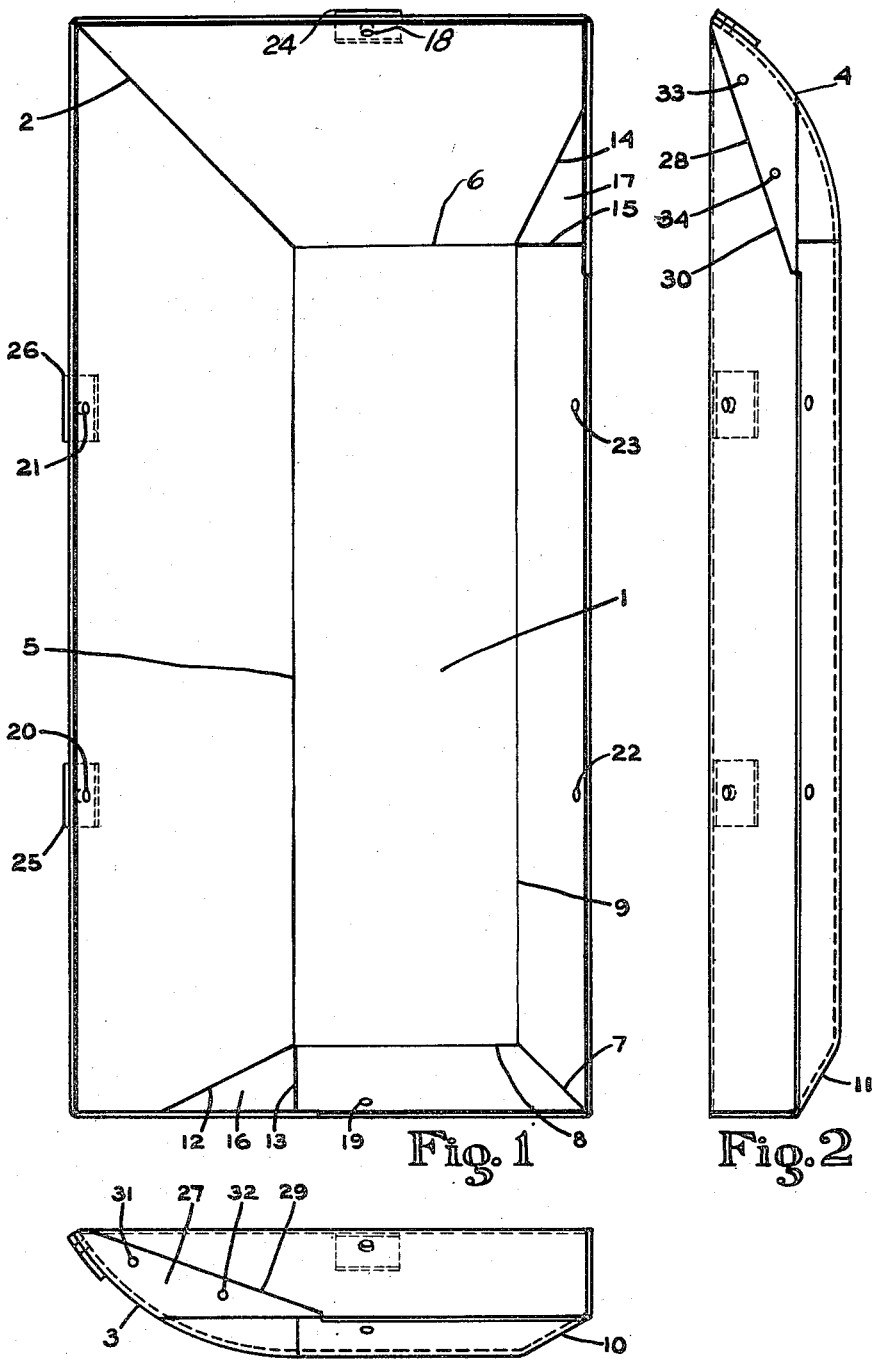
Witnesses:
Gustave W. Hilston
Emma Swanson
Inventor
Harold Swanson Patented Jan. 16, 1951

2,538,600

UNITED STATES PATENT OFFICE 2,538,600

FARM UTILITY BOAT

Harold Swanson, Brownhelm Township, Lorain County, Ohio

Application September 15, 1947, Serial No. 774,167

7 Claims. (Cl. 280—19)

This invention relates to improvements in constructing farm utility boats which can be used for several purposes in agricultural operations, but more particularly as a load carrying boat that slides over the surface of the ground and is hauled about with a farm tractor.

The main object of this invention is to show a practical means of constructing a farm utility boat of heavy steel plate that is formed with radial and bevel upturned edges from a flat bottom surface, which can be used in farming operations as a load hauling boat, a soil smoothening implement, a mixing box, or an animal feeding pan.

A further object is that this application is generally similar to that of my copending application for a Farm Utility Boat, Serial Number 750,675, filed May 27, 1947, in respect to where any improvements or subject matter of my earlier invention can be used to advantage with this invention, particularly the feature or novel use of hauling a farm utility boat either lengthwise or sideways over the ground with a farm tractor.

Other objects of this invention will appear more fully described and illustrated hereinafter.

Fig. 1, Fig. 2, and Fig. 3 show one farm utility boat by three views in third-angle orthographic projection; a plan or top elevation (Fig. 1), a side elevation (Fig. 2), and an end elevation (Fig. 3).

Referring to Fig. 1, Fig. 2 and Fig. 3 collectively which show a farm utility boat; having a large steel plate 1 approximately four feet wide by eight feet long (4' x 8') by any suitable thickness which is cut out with a developed cut that closes together and is electric welded at 2 when the plate 1 is radially bent upward on an approximate two feet radius (2' rad.) at 3 and 4 beginning on lines 5 and 6 respectively, and also cut out with a narrow V cut that closes together and is electric welded at 7 when plate 1 is bevel bent upward on lines 8 and 9 to form bevels 10 and 11, and also cut out with suitable developed cuts that close together and are electric welded at 12, 13, 14 and 15 forming plates 16 and 17 from part of plate 1 with suitable bends made therein so that plates 16 and 17 will blend from radius runners at 3 and 4 to bevel brims at 10 and 11 respectively; approximately one inch diameter (1" dia.) hitching holes at 18, 19, 20, 21, 22 and 23 are punched, drilled, or otherwise formed in the large steel plate 1 and also in the small steel reenforcement plates 24, 25, and 26, which are formed to fit the radii at 3 and 4 and welded all around their edges or electric spot-welded with the large steel plate 1; steel gusset plates 27 and 28 are cut out from separate plates along edges 29 and 30 and also cut out to fit and electric welded with the radius runners at 3 and 4, the tops of plates 16 and 17, and the bevels at 10 and 11 of the large plate 1 after having riser board attaching holes formed therein at 31, 32, 33, and 34. The riser boards are an accessory having a hinge holding them together on the corner near 7 and having pins or lugs to slip into holes 19, 22, and 23, with bolt holes to match and attach to the farm utility boat in holes 31, 32, 33 and 34. It is obvious that the riser boards can be made of wood or metal plate.

This farm utility boat can be made to any size to suit any particular need or requirement; also the thickness of the steel plates can be made to suit such needs, one-half inch ($\frac{1}{2}$") thick steel plate for heavy duty, three-eighths inch ($\frac{3}{8}$") thick steel plate for medium duty, and one-quarter inch ($\frac{1}{4}$") thick steel plate for light duty requirements.

In the construction of this farm utility boat, steel plate is cut out and formed and then electric welded together to manufacture the boat, which is an economical method of constructing a small number of boats; however when mass production of the boats becomes necessary the steel plates can be formed in dies with partial welds or without any welds from hot steel plate in deep drawing dies by making radii blends on joints at the gussets 27 and 28 and also the seams at 2, 7, 12 and 14.

The farm utility boat has one end and one side formed radially upward from a flat bottom surface to act as full width and full length runners across the boat so as to pass over and lead loose soil, stones, manure and other materials under the boat as it is hauled along the ground in a field that is being fitted for planting. On the sides opposite the radial runners the boat is bent upward to form beveled brims approximately four inches (4") deep. Hitch attaching holes are formed through the radial runners and the beveled brims near their upper edges for towing the boat forward or backward either lengthwise or sideways. The radial runners and the beveled brims of the boat also act to hold the loaded materials thereon and are joined to form a water tight trough.

This farm utility boat can be used for hauling operations with a farm tractor to carry stones, dirt or soil, farm implements and machines, logs and timber, building materials, cord wood, fence posts and fencing, drain tile, coal, crates, large cans and drums, barrels, fertilizer, manure, bailed hay and straw, bagged grain, nearly any type of farm produce such as ear corn, potatoes, apples, cabbage, melons, etc. or any other type of articles or materials that can be loaded thereon, with the advantage that manual labor is saved by not requiring a high lift from the ground to load and unload them.

The farm utility boat can also be used as a farm implement to prepare the soil for planting operations. The boat is hauled with a farm tractor directly attached or behind a disk-harrow in a sideways position as an improved planker to smoothen and level the soil or ground while towing it across the plowed field with as much weight added thereon as a tractor can pull. The boat can also be used by towing it sideways to break down corn stalks, briers, tall grass and weeds before plowing them under, also smoothen driveways and lanes with heavy loads thereon to pack down the dirt, gravel, cinders, or snow in the winter time.

The farm utility boat can also be used as a pan or trough for feeding animals therefrom by plugging the hitch holes on the beveled brim with wooden plugs so as to obtain the maximum depth of liquid therein. The boat then can be filled with slop or swill pig feed, ground feed or mash either wet or dry, shredded ensilage for cattle, almost any kind of grain with salt added, cow beets, etc.; also it can be filled with drinking water for a few animals. It being obvious that the boat with the animal feed thereon can be hauled to any location in the fields or barnyard.

The farm utility boat can also be used as a mixing box for hand shovel mixing concrete, mortar, lime, fertilizer, seeds, etc., by shoveling or hoe turning the materials therein.

The high radial runners of the farm utility boat provides a high brim and a place to start hand shoveling ear corn, potatoes, and other materials that are unloaded, when riser boards are attached to the low beveled brims, so as to carry bigger loads.

The farm utility boat can be easily loosened from the frozen ground in the winter time by building a quick straw fire in the bottom of the boat which thaws it free without damage or injury to the heavy steel plates. Then the boat is hauled away with a tractor to a new location where it will require many hours of resting before it will be again frozen fast to the ground.

The farm utility boat is purposely made with no sharp corners and also smooth on the inside surfaces to permit hand shoveling and sweeping out dirt, and even scrubbed clean with broom and water, that is swept out up the low beveled brims.

This farm utility boat shows the left-hand style of construction, however the boat can be made symmetrically opposite to a right-hand style of construction without departing from the improvements of this invention; also the building operations can be changed without altering the basic features described herein, particularly the features of constructing a farm utility boat that can be towed advantageously either lengthwise or sideways.

I claim:

1. A farm utility boat which is in combination a boat, implement, pan and mixing box all in a single unit, consisting of, a heavy steel rectangular plate having one side and one end formed radially upward into full width and full length runners for said boat and having the other side and the other end bevel bent upward into a brim extending between said runners of said boat, said runners having holes for attaching a hitch and providing a means to tow said boat either lengthwise or sideways along the earth, said end formed radially upward providing a means to tow said boat lengthwise on the earth to haul materials as a boat, said side formed radially upward providing a means to tow said boat sideways over a field to smoothen the soil as a farming implement, said runners and said brim forming sloped edges upward from the bottom of said boat to provide a means to hold liquids as a pan or hold materials for mixing as a box.

2. In a farm utility boat, the combination of, a rectangular heavy steel plate having one side and one end formed radially upward into full width and full length runners for said boat and having the other side and the other end bevel bent upward into a brim extending between said runners of said boat, said runners having holes for attaching a hitch and providing a means to tow said boat either lengthwise or sideways along the earth, said runners and said brim providing a means to hold liquids or other materials in said boat.

3. The combination, with a farm utility boat, a rectangular heavy steel plate having one side and one end formed radially upward into full width and full length runners for said boat and having the other side and the other end bevel bent upward into a brim extending between said runners of said boat, said runners having holes for attaching a hitch and providing a means to tow said boat either lengthwise or sideways along the earth, steel gusset plates attached to the ends of said runners and to the top of said brim to provide a means of stiffening the ends of said runners.

4. A farm utility boat, comprising, a rectangular heavy steel plate having one side and one end formed radially upward into full width and full length runners for said boat and having the other side and the other end bevel bent upward into a brim extending between said runners of said boat, said runners having holes for attaching a hitch and providing a means to tow said boat either lengthwise or sideways along the earth, said runners and said brim forming sloped edges upward from the bottom of said boat to provide a means to hold liquids or other materials therein.

5. The combination, of a farm utility boat, a farming implement, a pan and mixing box within a single unit, consisting of, a rectangular heavy steel plate having one side and one end formed radially upward into full width and full length runners and having the other side and the other end bevel bent upward into a brim extending between said runners of said boat, said runners having holes for attaching a hitch and providing a means to tow said boat either lengthwise or sideways along the earth, said end runner providing a means to tow said boat lengthwise, said side runner providing a means to tow said boat sideways over a field to smoothen the soil as a farming implement, said runners and said brim providing a means to hold liquids as a pan or hold other materials for mixing as a box therein.

6. A farm utility boat, consisting of, a rectangular heavy steel plate having one side and one end formed radially upward into full width and full length runners for said boat and having the other side and the other end bevel bent upward into a brim extending between said runners of said boat, said runners having holes for attaching a hitch and providing a means to tow said boat either lengthwise or sideways along the earth, said brim having holes for attaching a hitch and providing a means to tow said boat backward either lengthwise or sideways along the earth, said runners and said brim forming sloped edges upward from the bottom of said boat to hold liquids or other materials therein and provide a means to sweep out the boat clean with a broom.

7. A farm utility boat, consisting of, a rectangular heavy steel plate having one side and one end formed radially upward into full width and full length runners for said boat and having the other side and the other end bevel bent upward into a brim extending between said runners of said boat, steel gusset plates formed from the ends of said runners to the top of said brim to stiffen the ends of said runners and to provide a means of attaching riser boards to said brim, said runners having holes for attaching a hitch and providing a means to tow said boat either lengthwise or sideways along the earth, said runners and said brim forming sloped edges upward from the bottom of said boat to provide a means to hold liquids or other materials therein.

HAROLD SWANSON.

REFERENCES CITED

The following references are of record in the file of this patent:

UNITED STATES PATENTS

| Number | Name | Date |
|---|---|---|
| 870,462 | Penington | Nov. 5, 1907 |
| 1,162,473 | Gedge | Nov. 30, 1915 |
| 1,168,429 | Schnabel | Jan. 18, 1916 |
| 1,544,965 | Bavousett | July 7, 1925 |
| 2,050,548 | Uhren et al. | Aug. 11, 1936 |
| 2,424,694 | Jones | July 29, 1947 |